United States Patent [19]

Steiber et al.

[11] Patent Number: 5,217,807
[45] Date of Patent: Jun. 8, 1993

[54] METAL ACRYLATES AS RUBBER-TO-METAL ADHESION PROMOTERS

[75] Inventors: Joseph F. Steiber, Prospect; Sung W. Hong, Cheshire; Rebecca F. Seibert, Waterbury, all of Conn.

[73] Assignee: Uniroyal Chemical Company, Inc., Middlebury, Conn.

[21] Appl. No.: 625,793

[22] Filed: Dec. 11, 1990

Related U.S. Application Data

[63] Continuation of Ser. No. 297,900, Jan. 17, 1989, abandoned.

[51] Int. Cl.$^5$ ................................. C08J 5/04
[52] U.S. Cl. ....................... 428/378; 525/274; 525/349
[58] Field of Search ............... 525/274, 245, 261, 262, 525/301, 236, 237, 194, 195; 428/378

[56] References Cited

U.S. PATENT DOCUMENTS

| | | | |
|---|---|---|---|
| 4,259,218 | 3/1981 | Haws | 525/236 |
| 4,720,526 | 1/1988 | Roland | 525/273 |
| 4,756,353 | 7/1988 | Nordsiek | 525/236 |

FOREIGN PATENT DOCUMENTS

| | | |
|---|---|---|
| 2368515 | 5/1978 | European Pat. Off. . |
| 0039769 | 11/1981 | European Pat. Off. . |
| 0056156 | 7/1982 | European Pat. Off. . |
| 3737595 | 5/1988 | European Pat. Off. . |
| 49-15947 | 4/1974 | Japan . |
| 50-154386 | 12/1975 | Japan . |
| 58-23866 | 2/1983 | Japan . |
| 286770 | 6/1986 | Japan . |
| 273017 | 11/1986 | Japan . |

OTHER PUBLICATIONS

Chemical Abstracts, vol. 109, Nov. 28, 1988, p. 81, Abstract 191991a, and JP, A, 63139970 (Bridgestone Corp.) Jun. 11, 1988.
Abstract-T900,003, Method of Improving Rubber to Brass Adhesion (R. L. Arnold et al) Jul. 18, 1972.
USSR Patent 1,397,461 (23 May 88) English Abstract.

*Primary Examiner*—Christopher Henderson
*Attorney, Agent, or Firm*—Raymond D. Thompson

[57] ABSTRACT

This invention relates to the improvement of rubber-to-metal adhesion and adhesion retention in sulfur vulcanizable, metal reinforced rubber compositions via the use of metal acrylate and/or methacrylate adhesion promoters.

3 Claims, No Drawings

METAL ACRYLATES AS RUBBER-TO-METAL ADHESION PROMOTERS

This is a continuation of application Ser. No. 07/297,900 filed Jan. 17, 1989, now abandoned.

TECHNICAL FIELD

The present invention is directed toward improving the adhesion and adhesion retention between rubber compositions, such as those used in the manufacture of tires, conveyor belts, hoses and the like and brass coated wire or cable which is embedded in the stock.

The improved useful life of modern rubber compositions, especially in belting and tire end uses via more sophisticated and effective antiozonant/antioxidant packages have necessitated the desirability of adding materials to the rubber compositions to improve useful article life and service through increased reinforcing agent adhesion and adhesion retention. Improved adhesion between rubber and brass coated wire is obtained according to the present invention.

BACKGROUND ART

It is often desirable to reinforce rubber articles by incorporating therein metal reinforcing elements. For example, tires, conveyor belts, power transmission belts, timing belts, hoses and a variety of other rubber articles are often reinforced with metal wire. In order for rubber articles which are provided with steel reinforcing elements to function effectively, it is important that good adhesion between the rubber and the metal reinforcing elements be maintained. One of the most common methods of enhancing the adhesion of wire filaments to rubber is to coat the filament with another material, for example, pneumatic vehicle tires are often reinforced with cords prepared from steel filaments which are coated with brass. Normally, steel reinforcing elements are coated with a brass that is an alloy of copper and zinc. However, ternary brass alloys that are useful for coating steel reinforcing elements are also known by those skilled in the art. For example, U.S. Pat. No. 4,347,290 discloses a ternary brass alloy which contains copper, zinc and cobalt. These and other ternary alloys, such as those containing copper, zinc and iron or tin are known to be effective in improving rubber to metal adhesion.

It is also known that various agents can be mixed into the rubber which will increase adhesion between the rubber and metal reinforcements imbedded in it. U.S. Pat. No. 3,894,903 discloses a process for improving the bonding of rubber to copper and copper alloys by incorporating into the rubber before vulcanization certain triazines, for example 2-N-hydroxyphenoxy-4-chloro-6-aminotriazine.

U.S. Pat. Nos. 3,991,130 and 3,905,947 disclose a method for improving adhesion between vulcanizable elastomeric compositions and metal surfaces by incorporating into the elastomer an organo-nickel salt and then subsequently vulcanizing the elastomeric composition while it is in contact with the metal surface.

U.S. Pat. No. 4,521,558 improves rubber adhesion to metal via the use of allyl phosphite and phosphate esters and various iminodiacetic acids and salts.

Cobalt complexes such as cobalt-mercaptobenzothiazole complexes as disclosed in UK Patent No. 914,787 have been used in natural and synthetic rubbers both as accelerators and to permit the rubber to be bonded more effectively to ferrous metals during vulcanization.

Acrylates have been added to various non-crosslinkable synthetic resin systems to improve adhesion to certain metals. For example, calcium acrylate was added to polyvinylchloride in Japan Kokai 52/3633 (Jan. 12, 1977) to improve the resin adhesion to soft steel sheet. Japan Kokai 50/77486 (Jun. 24, 1975) discloses the use of aluminum, zinc and/or calcium acrylates in non-curing PVC compositions to yield improved peel strengths with zinc wire. Polyolefin hot melt adhesives for aluminum were taught in Japanese Kokai 51/4223 (Jan. 14, 1976) to have bonding peel strength increased via the addition of zinc acrylate to the adhesive composition.

Metal diacrylates are known to function as cross-linking agents for rubbery material in the presence of various peroxide initiator systems. For example, Japanese Kokai 50/154386 (Dec. 12, 1975) discloses that adhesion to zinc-plated iron is good with EPDM/peroxide/carbon black compositions containing aluminum, zinc and/or calcium acrylate.

Similar results are taught in Japanese Patent 49/15947 (Apr. 18, 1974) which discloses a steel bonding composition containing rubber, a peroxide, carbon black and glycidyl methacrylate.

A two part liquid adhesive for steel plates is described in Japanese Kokai 58/23866 (Feb. 12, 1983) as containing an elastomer, a peroxide, an alkali metal and acrylic monomer.

Acrylates, at levels useful for promoting rubber adhesion to metal are not known to contribute to rubber crosslinking when sulfur curing systems are used.

Peroxide initiated curing systems for rubbery materials have proven to be unsatisfactory in the production of finished articles that are required to have extended flex life, for peroxide cured rubbers tend to crack when subject to repeated flexing. Additionally, peroxide curing systems tend to be expensive and because of their reactivity, they require careful handling to avoid the creation of a dangerous environment.

As a result, many industries, such as the tire and industrial belting industries prefer to use sulfur cure vulcanization systems for cross-linking rubber.

SUMMARY OF THE INVENTION

This invention reveals the use of metal acrylates in sulfur curable rubber-metal composites to increase the adhesion and adhesion retention between the metal and the rubber composition. Furthermore, most of the metal acrylates of this invention do not negatively effect the processing or cured properties of the systems as is often the case with previous adhesion promoters. As a result of the retention of the inherently desirable properties of the system, the composites are useful in finished goods requiring long life, such as tires or industrial belting.

More specifically, this invention discloses a composite comprising a sulfur curable rubber composition with brass coated metal wire embedded therein wherein said rubber composition contains from about 0.05 to about 20 parts per hundred parts of rubber of at least one adhesion promoter selected from acrylate and methacrylate salts of di- and tri-valent metals.

DETAILED DESCRIPTION OF THE INVENTION

This invention relates to sulfur curable rubber compositions reinforced with brass coated metal wherein the composition contains certain metal acrylate adhesion promoters and composite articles made therefrom.

The rubber in the composites of this invention can be selected from a wide variety of rubbery polymers for the instant adhesion promoters are effective in both natural and synthetic rubbers that are sulfur curable.

Some representative examples of rubbers commonly used in the composites of this invention include natural rubber, styrene-butadiene rubber, synthetic polyisoprene, polychloroprene, cyclene rubbers, polybutadiene, nitrile rubbers, carboxylated nitrile rubbers, butyl rubbers, EPDM (ethylene-propylene-diene) rubbers, epichlorohydrin homo and copolymers, EPR (ethylene-propylene) rubbers, polyisobutylene, norbornene rubbers, thiokol rubbers, and blends of various combinations of these and other diene rubbers.

The curative systems employed in the cross-linking of the compositions of this invention comprise sulfur and/or a sulfur donor compound and preferably, at least one sulfur cure accelerator.

The sulfur donor compounds which may be employed in conjunction with or in the alternative to sulfur are well known to those skilled in the art of rubber compounding. Illustrative of such sulfur donor compounds are 2-(4-morpholinyldithio)benzothiazole, 4,4-dithiodimorpholine, N,N'-caprolactam disulfide and the like.

The sulfur cure accelerators which may be employed include thioureas, such as N,N'-dibutylthiourea, 2-mercaptoimidazoline, tetramethylthiourea and the like; guanidine derivatives, such as N,N'-diphenylguanidine and the like; heterocyclics, such as mercaptobenzimidazole, mercaptobenzthiazole, 2,2'-dibenzothiazyl disulfide, zinc 2-mercaptobenzothiazole and the like; and sulfenamides, such as N-oxydiethylene-2-benzothiazolesulfenamide, N-t-butylbenzothiazylsulfenamide, N-cyclohexyl-2-benzothiazylsulfenamide, N,N-diisopropyl-2-benzothiazylsulfenamide and the like. Moreover, mixtures of two or more sulfur cure accelerators may be employed in the curing agent of this invention. The preferred accelerators are thiazoles and sulfenamides, with sulfenamides being particularly preferred.

The sulfur cure accelerator is generally present in amounts of between about 0.1 parts and about 5 parts per 100 parts of rubber, with preferably between about 0.3 part and about 3.0 parts of accelerator per 100 parts of rubber being present. Most preferably, between about 0.3 parts and about 2.0 parts of accelerator per 100 parts of rubber are employed.

Generally, between about 0.2 and about 10, preferably between about 3.0 and about 8.0 parts of sulfur per hundred parts of rubber are employed.

Many terms are used to describe the metal reinforcing elements used to strengthen rubber articles. The terms "cord", "tire cord", "cable", "strand", "wire", "rod", "plate", and "filament" can all be used to describe metal reinforcing elements used to strengthen rubber articles. The term "metal reinforcement" as used herein is devised to be generic to all articles for reinforcing rubber articles including those listed above. Thus, without being limited thereto, a metal reinforcement can be a metal wire, metal cord, a metal tire cord, a metal cable, a metal strand a metal rod, a metal plate or a metal filament.

The metal reinforcement elements which are generally preferred for use in this invention are brass plated steel.

Metal wires used in the tire industry are manufactured by cold drawing high carbon steel and subsequently brass plating same. The brass plating not only enhances the adhesion of the wire cord to rubber but also facilitates drawing the wire to a fine diameter of about 0.20 mm. The wire filaments are combined to form a strand and several strands combined to obtain the final tire cord.

The adhesion promoters of this invention are the acrylate and methacrylate salts of di- and tri-valent metals. Preferred are the aluminum, zinc and magnesium acrylate and methacrylate salts either alone or in combination with various commercially available bonding agents such as the cobalt salts, e.g., cobalt stearate which is widely used in the tire industry; 2,3,5,6-tetrachloro-1,4-benzoquinone (sold by Uniroyal Chemical under the trademark VULKLOR); and various formaldehyde and resorcinol donors well known to the art.

The adhesion promoters of this invention can be mixed into a rubber using ordinary compounding techniques. Generally, it will be convenient to mix the adhesion promoter into the rubber composition of this invention simultaneously with other desired compounding ingredients using any suitable mixing equipment known to those skilled in the art, such as an internal mixer or mill. Normally, the rubber compositions used in the composites of this invention will be compounded with sulfur and carbon black. Numerous mineral fillers, such as clay and silica are commonly used a partial or total replacements for carbon black. The rubber compositions of this invention will also commonly contain cure accelerators, scorch inhibitors, antidegradents, pigments, and processing oils.

The essence of the present invention also finds utility in, for example, other rubber articles bonded to brass or brass-plated steel such as motor mounts, cutless bearings, springs, power belts, printing rolls, metal wire reinforced or braided hose, and wherever it is desired to secure rubber to metal or provide a flexible and strong, thermally stable bond between same.

The rubber articles of this invention can be produced by following a procedure which comprises: 1) preparing a rubber composition which contains at least one adhesion promoter of this invention, 2) surrounding the metal reinforcement with the rubber to conform to the desired shape of the rubber article being produced, and 3) curing (vulcanizing) the rubber article. Vulcanization of the blends may be carried out in a press, an oven, or other suitable means until cross-linking has occurred to a satisfactory state of cure.

Thus, standard techniques well-known to those skilled in the art for manufacturing rubber articles with metal reinforcing elements embedded therein can be employed in this invention. In other words, metal reinforcements can be incorporated into the rubber articles of this invention using the same techniques that are employed in incorporating metal reinforcements into ordinary rubber articles. Generally, reinforcing elements are simply surrounded by uncured rubber containing an adhesion promoter of this invention in a mold and vulcanized to produce the desired rubber article which has the metal reinforcement embedded therein.

In the practice of this invention generally from about 0.05 to about 20 parts per hundred parts of rubber by weight (phr) of the adhesion promoter will be employed in the rubber composition. It is generally preferred for 0.1 to 10 parts of adhesion promoter to be employed in the rubber composition per hundred parts of rubber by weight. It is more preferred for 0.5 to 6 phr of an adhesion promoter to be employed in the rubber composition. It should be noted that various blends of different adhesion promoters can be employed in the rubber compositions of this invention.

The adhesion promoters described herein can be distributed (mixed) throughout a rubber using any convenient, technique known to those skilled in the art. The rubber compositions of this invention are also cured using standard techniques well known to those skilled in the art. Generally, such rubber compositions are cured (vulcanized) under pressure at a temperature ranging from about 100° C. to about 233° C. with a metal reinforcement being embedded in the rubber composition so as to form a composite article. It is generally preferred for such composite articles to be cured at a temperature ranging from 100° C. to 205° C.

The practice of the present invention has been observed to result in improved aged rubber-metal adhesion, in many cases with improved initial (original) adhesion. The following examples are included to further illustrate the rubber-metal composites within the scope of this invention and to compare them with other rubber-metal composites outside of its scope. Such comparisons clearly show the superior adhesion retention obtained by practicing the present invention. The following examples are merely for the purpose of illustration and are not to be regarded as limiting the scope of the invention or the manner in which it can be practiced. Unless specifically indicated otherwise, all parts and percentages are given by weight.

EXAMPLES

All of the following examples utilize a Masterbatch of the following recipe:

| | Parts by Weight |
|---|---|
| Rubber | |
| Natural Rubber (SMR 5CV) | 80.00 |
| Polybutadiene | 20.00 |
| Carbon Black | 55.00 |
| Zinc Oxide | 10.00 |
| Stearic Acid | 1.50 |
| Aromatic Oil | 7.00 |
| Tackifier Resin | 2.00 |
| Diphenylamine/Acetone Reaction Product Antioxidant | 1.50 |
| N-phenyl-N'-(1,3-dimethylbutyl)-p-phenylenediamine Antiozonant | 1.00 |
| Total | 178.00 |

The Masterbatch is prepared by mixing the rubber in an internal mixer and after one minute adding the zinc oxide and one-half of the carbon black. After three minutes, the balance of the ingredients is added. The unit is "swept-down" at five minutes and the material discharged at seven minutes at from about 122° C. to about 150° C.

Two such batches as described above are prepared and milled together to realize the final Masterbatch.

Examples A through V are prepared from the following recipe:

| | Parts by Weight |
|---|---|
| Masterbatch | 178.00 |
| Acrylate (as indicated) | |
| Additional Adhesion Promoters (as indicated) | |
| N-oxydiethylene-2-benzothiazole-sulfenamide Accelerator | 0.70 |
| N-(cyclohexylthio)-phthalimide Retarder | 0.10 |
| Insoluble Sulfur Vulcanizer (80% Oiled Crystex, a Trademark of Stauffer Chemical Co.) | 5.00 |

One half of the Masterbatch, the above powders and the balance of the Masterbatch are added sequentially to an internal mixer and subsequently discharged at 100° C. Each example is then mill blended for five minutes.

Samples of each of the composition examples, which are similar to commercial tire breaker compositions were cured for 25 minutes at 160° C. Other samples were cured for 10 minutes at 177° C.; the higher temperature cures simulating the "fast cures" favored by the tire industry. Unaged Physical Properties, i.e., Tensile Strength, 300% Modulus, % Elongation, Shore A Hardness and Tear (Die C) were determined on these samples at room temperature and, except for the Shore A Hardness, at 121° C.

The "Adhesion To Steel Cord" test was conducted according to ASTM D-2229 with pounds to pull-out measured at 121° C. The adhesion pads were cured for a) 50 minutes at 160° C. or b) 20 minutes at 177° C. as indicated using 2×2 brass coated steel wire.

Tables I and II give the amounts of the various acrylates of this invention that are present in the samples and the additional bonding agents, if any. Unaged Physical Properties at room temperature and at 121° C. are presented.

The wire adhesion data for each example shows the force in pounds necessary to pull or remove the brass coated steel reinforcing wire from the vulcanized pad. This "pull-out" force is followed (in the aged and/or steamed samples) by the percentage of original force retained. Finally, the amount of rubber remaining on the wire was determined by visual examination and has been reported as percent retained rubber coverage, wherein 5 represents 100% coverage; 2 represents 40% coverage; etc.

The rubber coverage measurement is significant in that it visually represents the adhesion of the rubber composition to the brass plated steel cord. As is well known to those skilled in the art, the amount of rubber adhering to the steel cord after it has been pulled from a cured adhesion pad represents the relationship of the adhesive force attaching the rubber composition to the surface of the steel cord and the tear strength of the rubber composition itself. Large percentages of rubber coverage indicate that the adhesion to the steel cord exceeds the internal strength of the rubber composition itself, i.e., tear strength. Therefore, when the rubber coverage is very high it can be concluded that the metal to rubber adhesion is greater than the force measured to pull the steel cord out of the rubber pad since the force measured was a result of the rubber composition rupturing and not the metal to rubber interface.

Normal or unaged testing is merely a measurement of the initial adhesion properties between the rubber composition and the metallic reinforcement. Steam aging is an accelerated humidity aging test and is significant in determining the chemical stability of the chemical bonds formed between the rubber and the metallic reinforcement when exposed to moisture or steam.

TABLE I

| | A | B | C | D | E | F |
|---|---|---|---|---|---|---|
| Aluminum Dimethacrylate | | 2.0 | | | | |
| Aluminum Diacrylate | | | 2.0 | | | |
| Zinc Dimethacrylate | | | | 2.0 | | |
| Magnesium Diacrylate | | | | | 2.0 | |
| Bonding Agent R-6 | | | | | | 2.0 |
| Resorcinol Donor Vulklor (2,3,5,6-tetrachloro-1,4-benzoquinone) | | | | | | 1.0 |
| Wire Adhesion lbs. pull/in @ 250° F. Cured 20' @ 350° F. (177° C.) | | | | | | |
| Unaged | 73 | 90 | 67 | 78 | 61 | 89 |
| Aged 2 weeks @ 158° F. | 45 | 69 | 72 | 52 | 50 | 50 |
| % Retention | 64 | 77 | 104 | 67 | 82 | 56 |

TABLE II

| RECIPE | PHR | A | B | C | D | E | F | G | H | I | J | K | L | M | N |
|---|---|---|---|---|---|---|---|---|---|---|---|---|---|---|---|
| SMR 5CV | 80.00 | | | | | | | | | | | | | | |
| POLYBUTADIENE 1203 | 20.00 | N | A | N | A | N | A | N | A | N | A | N | A | A | N |
| CARBON BLACK N-351 | 55.00 | N | L | N | L | N | L | N | L | N | L | N | L | L | N |
| ZINC OXIDE | 10.00 | D | D | D | D | D | D | D | D | D | D | D | D | D | D |
| STEARIC ACID | 1.50 | A | A | M | M | A | A | M | M | A | A | M | M | M | M |
| AROMATIC OIL | 7.00 | | | A | A | | | A | A | | | A | A | A | A |
| TACKIFIER RESIN | 2.00 | | | | | | | | | | | | | | |
| DIPHENYLAMINE/ACETONE REACTION PRODUCT ANTIOXIDANT | 1.00 | | | | | | | | | | | | | | |
| * | 0.10 | | | | | | | | | | | | | | C |
| ** | 0.70 | | | | | | | | | | | | | | O |
| 80% OILED CRYSTEX | 5.00 | | | | | | | | | | | | | | N |
| | | | | | | | | | | | | | | | T |
| | | | | | | | | | | | | | | | R |
| | | | | | | | | | | | | | | | O |
| | | | | | | | | | | | | | | | L |
| BONDING AGENT R-6 | as indicated | 0.10 | 0.10 | 0.10 | 0.10 | | | | | | | | | | |
| SRF 1588A RESIN | as indicated | — | — | — | — | 2.00 | 2.00 | 2.00 | 2.00 | — | — | — | — | — | — |
| *** | as indicated | — | — | — | — | — | — | — | — | 2.00 | 2.00 | 2.00 | 2.00 | 2.00 | 2.00 |
| **** | as indicated | — | — | — | — | — | — | — | — | — | — | — | — | — | — |
| COBALT STEARATE | as indicated | — | — | — | — | — | — | — | — | — | 1.00 | 1.00 | 1.00 | — | 1.00 |
| VULKLOR | as indicated | — | — | — | — | — | — | — | — | — | — | — | — | — | — |
| METAL DIACRYLATE | as indicated | 2.00 | 2.00 | 2.00 | 2.00 | 2.00 | 2.00 | 2.00 | 2.00 | 2.00 | 2.00 | 2.00 | 2.00 | 1.00 | 2.00 |
| MOONEY SCORCH, MS @ 270° F. | | 17'15" | 17'0" | 19'0" | 17'0" | 15'0" | 14'45" | 15'0" | 14'15" | 13'30" | 13'45" | 14'45" | 13'30" | 14'15" | 13'45" |
| PHYSICAL PROPERTIES - Cured 25 Minutes @ 320° F. UNAGED | | | | | | | | | | | | | | | |
| Tensile Strength | | 3470 | 3290 | 3350 | 3260 | 3160 | 3100 | 3300 | 3090 | 3100 | 3020 | 3160 | 3200 | 3180 | 3060 |
| 300% Modulus | | 1790 | 1810 | 2450 | 2010 | 1910 | 1720 | 2450 | 1890 | 1770 | 1590 | 2010 | 1820 | 2040 | 2110 |
| Elongation | | 510 | 470 | 400 | 440 | 450 | 480 | 420 | 450 | 500 | 500 | 460 | 510 | 440 | 440 |
| UNAGED @ 250° F. (121° C.) | | | | | | | | | | | | | | | |
| Tensile Strength | | 1810 | 1820 | 1660 | 1780 | 1680 | 1620 | 1770 | 1710 | 1780 | 1640 | 1640 | 1540 | 1630 | 1490 |
| 300% Modulus | | 1080 | 1070 | 1450 | 1280 | 1170 | 1020 | 1220 | 1090 | 1220 | 1080 | 1430 | 1200 | 1430 | 1340 |
| Elongation | | 410 | 450 | 320 | 360 | 360 | 410 | 380 | 410 | 410 | 410 | 310 | 330 | 320 | 310 |
| WIRE ADHESION TESTING - lbs. pull/inch @ 250° F. UNAGED | | 90* | 84 | 90* | 76 | 90* | 80 | 90* | 77 | 90* | 90* | 84 | 89 | 90* | 90* |
| Coverage | | — | 5 | — | 4 | — | 5 | — | 4 | — | — | 5 | 4 | — | — |
| AGED 1 DAY IN STEAM @ 100° C. (212° F.) | | 48 | 49 | 45 | 39 | 52 | 40 | 46 | 42 | 38 | 50 | 52 | 57 | 37 | 21 |
| % Retention | | 53 | 58 | 50 | 51 | 58 | 50 | 51 | 55 | 42 | 56 | 62 | 67 | 41 | 23 |
| Coverage | | 4 | 5 | 3 | 3 | 4 | 5 | 4 | 3 | 2 | 4 | 4 | 3 | 3 | 1 |
| AGED 3 DAYS IN STEAM @ 100° C. (212° F.) | | 30 | 36 | 27 | 37 | 34 | 32 | 38 | 30 | 27 | 40 | 35 | 42 | 24 | 14 |
| % Retention | | 33 | 43 | 30 | 49 | 38 | 40 | 42 | 39 | 30 | 44 | 42 | 47 | 27 | 16 |
| Coverage | | 3 | 2 | 0 | 2 | 2 | 3 | 2 | 1 | 1 | 3 | 3 | 3 | 1 | 1 |

*N-PHENYL-N'-(1,3-DIMETHYLBUTYL)-P-PHENYLENEDIAMINE
**N-OXYDIETHYLENE-2-BENZOTHIAZOLE SULFENAMIDE ACCELERATOR
***N-(CYCLOHEXYLTHIO)-PHTHALIMIDE RETARDER
****NITROMETHYL PROPANOL
ALDA: Aluminum diacrylate
ALDMA: Aluminum dimethacrylate
ZNDA: Zinc diacrylate
ZNDMA: Zinc dimethacrylate
NOTE
UNAGED WIRE ADHESION RESULTS: If three or more wires failed before the adhesion failed, result recorded is 90*. This is based upon the tensile strength of the wire. % retention was then based on 90 lbs. pull/inch. Other unaged data was based on an average of three numbers.

In Table I, the percent retention of adhesion data after two weeks oven aging at 158° F. (70° C.) shows that compositions containing the acrylate or methacrylate salt of di- or tri-valent metal provide outstandingly improved adhesion over that provided by Example A which does not contain any promoter or by Example F, a commercially used system of Vulklor and a resorcinol donor combination.

In Table II, the percent of adhesion retention data (after one and three days steam agings at 100° C.) of examples A through D inclusive which use the acrylates of this invention as the sole adhesion promoter versus the composition of examples M and N, which are commercially utilized adhesion promoter systems, illustrates the superior adhesion results unexpectedly realized via the use of the metal acrylates of this invention in sulfur vulcanized rubber compositions. At the same time, the Unaged Physical Properties of the composition are essentially unaffected.

Bonding Agent R-6 and SRF 1588A resin are resorcinol donors. As the percent of adhesion data after three days steam aging at 100° C. clearly indicates, compositions containing a metal acrylate of this invention in combination with resorcinol/formaldehyde donor systems, i.e. SRF 1588A Resin and NMP (Examples E through L inclusive), provide outstandingly improved adhesion over that achieved with the commercially utilized adhesion promoter cobalt stearate in identical combinations or the Vulklor and resorcinol donor combination (Examples M and N), again with the unaged physical properties essentially unaffected.

In summary, it is well-known that acrylates can be grafted to unsaturated rubber using peroxide systems. Furthermore, unsaturated rubbers can be cured using acrylate/peroxide cure systems. The instant invention relates to sulfur and accelerated sulfur cure systems. With these sulfur cure systems, acrylate salts at the levels useful for promoting adhesion to metal have little or no effect on the curing of the rubber composition nor on the cured properties of unreinforced compositions. Therefore, the superior adhesion brought about by the metal acrylates of this invention is unexpected.

In conclusion, it is to be understood that all methods and rubber compounds disclosed herein fall within the scope of the claimed invention and that the subject invention is not to be limited by the examples set forth herein. As will be apparent to those skilled in the art, the formulation of the rubber composition can be varied within the scope of the total specification disclosure by selection of various rubbers of the type set forth herein as well as the amounts thereof, and of the acrylate adhesion promoters and it is believed that practice of the present invention can be determined without departing from the spirit of the invention herein disclosed and described, the scope of the invention being limited solely by the scope of the attached claims.

What is claimed is:

1. A reinforced elastomeric composition produced by curing a brass coated metal reinforcement in intimate contact with a blend of:
   a) vulcanizable rubber;
   b) from about 0.2 to about 10.0 parts of sulfur per 100 parts by weight of rubber; and
   c) from about 0.1 to about 5.0 parts of sulfur cure accelerator per 100 parts by weight rubber, wherein the sulfur cure accelerator is selected from the group consisting of a benzylthiazole sulfenamide, 2-mercaptobenzothiazole or benzylthiazyl disulfide; and
   d) from about 0.05 to about 20 parts of a diacrylate or dimethacrylate salt of aluminum, zinc or magnesium per hundred parts by weight of rubber.

2. A reinforced elastomeric composition of claim 1 further comprising:
   from about 0.05 to about 20 parts of at least one bonding agent selected from the group consisting of cobalt salt, 2,3,5,6-tetrachloro-1,4-benzoquinone, a formaldehyde donor and a resorcinol donor.

3. A reinforced elastomeric composition of claim 1 wherein the vulcanizable rubber is selected from the group consisting of natural rubber, synthetic rubber, and blends thereof.

* * * * *